3,305,375
PLASTER COMPOSITION
Edwin J. Jakacki, Des Plaines, Ill., assignor to United States Gypsum Company, Chicago, Ill., a corporation of Illinois
No Drawing. Filed July 9, 1963, Ser. No. 293,900
9 Claims. (Cl. 106—109)

This invention relates to an improved calcined gypsum plaster composition and more particularly to such a plaster composition having improved working and finishing characteristics by the inclusion therein of a small amount of finely divided dead burned gypsum.

Plaster has long been recognized as an excellent surfacing material for interior walls and ceilings. One well known plastering practice is to apply the plaster in several relatively thick coats to a suitable base such as gypsum lath. Another relatively new method of plastering which is now gaining wide commercial acceptance, is "thin-coat" plastering. Such practice is distinguished from earlier methods by the application of one or more very thin layers of plaster, generally only about 1/16 to about 1/8 inch thick, usually over a special type of gypsum lath. The plaster is usually quick setting and is applied as a thin aqueous slurry by spraying or also by hand. The joints between the plaster lath are reinforced in a suitable manner such as by an open tape made from glass fibers. The commercial attractiveness of these "thin-coat" plastering techniques is obvious since less material is required, application times are less and the necessary time lapse between application and final finishing, such as painting, is considerably less than when the plaster is applied in the usual two or three relatively thick coats.

In order to obtain a thin-coat plaster which is highly resistant to damage and abrasion, it is generally preferred to use a considerable proportion of alpha-gypsum in the plaster formulation. The alpha-gypsum, also referred to as alpha type of calcium sulfate hemihydrate, is lower in consistency, and is harder and stronger when set than ordinary or beta-gypsum, which is usually made by calcining in a kettle or a rotary calciner. As is known in the art, alpha-gypsum is best prepared by calcining in a steam or superheated water environment as is taught in U.S. Patent No. 1,901,051 to Wilbur S. Randel and Manvel C. Dailey.

The inclusion of alpha-gypsum in a plaster composition gives a surface of greater tensile strength, hardness and resistance to abrasion than does ordinary beta-gypsum. These qualities are desirable in plaster utilized for "thin-coat" plastering. This is not to say that a certain proportion of beta-gypsum cannot be used in the plaster composition and still obtain a very satisfactory surface. Moreover, satisfactory surfaces can also be obtained in some cases with an all beta-gypsum plaster. However, comparing the two types of plasters alone, the alpha-gypsum is generally superior as an interior finishing material with respect to strength, hardness and durability. These qualities assume even greater importance in the "thin-coat" finishes.

Unfortunately, the working and trowelling qualities of these finish plasters, perhaps more so in the case of alpha-gypsum, are generally less than desired when a smooth surface is desirtd. These plasters tend to spread poorly and tend to form catfaces, trowel marks, blisters and other blemishes when trowelled to a smooth finish. Obviously, a completely satisfactory plaster and particularly a "thin-coat" plaster, which is to be applied to various surfaces, must have good working qualities. One working quality of these plasters, which is of great importance in achieving a smooth, even, unblemished finish is commonly referred to in the art as "fattiness." As used in the art this term is not susceptible of a strict definition, but has been used instead largely in a descriptive sense and in conjunction with the property referred to as plasticity. "Fattiness" connotes the buttery build up of material by working plaster with a trowel after it has become firm, i. e. after some of the water has been drawn from the plaster by the base material upon which the plaster has been applied or a partial set has developed. The material thus worked up by the trowel is known as "fat." Where a smooth even finish is desired, this "fat" can be easily spread and used to fill pores, voids, catfaces and other blemishes. The accumulation of this fattiness during trowelling also enables trowel marks to be readily removed. Another important working quality of plaster is plasticity which is something different from "fatiness" as contemplated herein. A standard test for evaluating plasticity is the American Society for Testing Materials' test C110–58.

Heretofore one of the most satisfactory interior finishing materials possessing desirable fattiness and plasticity characteristics is that known as lime putty which is made by adding between about 20 to 30% powdered dry beta-gypsum, known as gauging plaster, to a dolomitic lime soaked in or mixed with water to a buttery plasticity. While this type of finish has desirable qualities, it is not completely satisfactory as a thin layer over a plaster lath base. It does not reach a sufficient hardness quickly as is desired and as would be obtained by the use of a higher percentage of plaster.

Various materials besides lime, such as, for example, clay, talc, asbestos, etc. have been added to improve the working qualities of plaster but these all have certain disadvantages such as failure to supply sufficient fat, adverse effects on the strength or hardness of finish plaster or perhaps on the way the plaster responds to the removal of water by the base material. Moreover, none of these substances, with the exception of lime, will improve a calcined gypsum plaster sufficiently to produce a satisfactory smooth surface. Unfortunately, for noticeable improvement in the properties of these plasters the lime must be employed in relatively large amounts. The use of large amounts of lime in thin-coat plasters which are to be applied directly to a paper covered lath such as gypsum lath is prohibited because plaster which contains substantial amounts of lime will not form a proper bond with plasterboard lath; the bond between the plaster and the paper of the lath being susceptible to failure. If a plaster formulation is to be applied suceessfully to a plasterboard lath and finished to a smooth even blemish-free surface some means of imparting fattiness to the formulation, other than by the use of lime, is therefore desired.

The present invention resides in the discovery that incorporation in gypsum plasters of relatively minor amounts of a specially prepared and calcined gypsum will markedly improve the working and finishing properties of the plaster.

Accordingly, it is an object of this invention to provide a plaster composition of calcined gysum having improved working and finishing properties as well as good strength and hardness characteristics.

It is another object of this invention to provide a finish plaster composition from calcined gyysum which can be applied in thin layers and trowelled to a smooth surface.

It is a further object of this invention to provide a plaster composition from calcined gypsum which can be readily trowelled to a thin smooth hard surface and which exhibits good bonding characteristics with paper surfaces of a gypsum lath.

It is a still further object of this invention to provide a finish plaster containing a substantial propertion of alpha-gypsum and having good fattiness and plasticity characteristics which confer thereto excellent working qualities.

It is another object of this invention to provide an additive which when added to alpha- or beta-type gypsum finishing plasters will markedly enhance working and finishing qualities of the plaster without adversely affecting strength, hardness and other desirable properties.

In accordance with this invention there is provided a gypsum plaster composition having improved working and finishing properties attributable to the inclusion in the composition of minor amounts of a dead burned gypsum additive, the particles of which have a minimum surface area as specified. As is known in the art, dead burned gypsum is gypsum or calcium sulfate which has been calcined at temperatures sufficiently high so as to remove all of the water of hydration and to convert the calcium sulfate to an anhydrous form which is non-hydrating or capable only of extremely slow hydration, commonly referred to as insoluble anhydrite. In general, calcination temperatures as low as about 370° F. can be employed to produce dead burned gypsum, however higher temperatures on the order of about 1000 to 1400° F. are generally utilized and preferred for this purpose. The dead burned gypsum additive is employed in accordance with this invention in finely divided condition such that the particles thereof have a Blaine surface area value of more than about 10,000 square centimeters per gram. The Blaine value or coefficient for surface area of the finely divided dead burned gypsum can be determined by procedure C204–55 of the American Society for Testing Materials as modified for plaster.

To provide for more rapid testing, various powdered gypsum products such as anhydrite, hemihydrate and dihydrate calcium sulfate are tested at a porosity of 0.570. Sample size is calculated using the equation $W = PV(1-e)$ where:

$W$ = sample weight
$P$ = specific gravity of sample
$V$ = volume of compacted bed (1.98 cc. for Unit No. J–3)[1]
$e$ = porosity of compacted bed.

Specific surface area of sample is calculated from the following equation:

$$S = K \frac{\sqrt{e^3}\sqrt{T}}{P(1-e)\sqrt{n}} \quad (2)$$

where $S$ = surface area
$K$ = constant for individual apparatus as calculated using National Bureau of Standards Standard Sample No. 114 (for this unit, $K = 19.2$)
$\sqrt{n} = 0.0136$ at room temperature ($n$ = viscosity of air)
$T$ = time in seconds for manometer fluid to move from second to third marks on instrument.

A simplified form of the Equation 2 is:

$$S = K_2\sqrt{T} \quad (3)$$

where $K_2$ is a resolution of all the components of (2) except the variable $T$

[1] Using Precision Instrument Co. Blaine apparatus, Serial #J–3, sample weights and $K_2$ factors for various gypsum materials are:

| Material | Sample weight, g. | Equation (3), $\sqrt{T}$ |
|---|---|---|
| Finely ground dead burned gypsum | 2.28 | 581 |
| Gypsum (CaSO₄.2H₂O) | 1.98 | 633 |
| Alpha gypsum | 2.32 | 529 |
| Beta gypsum | 2.28 | 536 |
| Natural anhydrite, CaSO₄ | 2.52 | 497 |

A dead burned gypsum additive having at least a minimum surface area as specified has been found to improve significantly the working or trowelability properties of a gypsum plaster composition in which it is incorporated. The additive markedly improves the fattiness and water retentivity properties of the plaster composition with the result that upon trowelling the plaster to form a wall a smooth surface relatively free from trowel marks, catfaces and other blemishes is obtained. Moreover, incorporation of the additive does not adversely affect the strength and surface hardness of the plaster when set.

Thus, the plaster compositions of this invention comprise a major amount of calcium sulfate hemihydrate which can be either alpha or beta type gypsum and a minor amount of dead burned gypsum having the specified surface area characteristics. Other ingredients normally employed in plaster compositions, as is known in the art, can also be included in compositions embraced by the invention. These ingredients can be, for example, the various aggregate materials such as sand as well as set controlling additives including accelerators such as aluminum sulfate, potassium sulfate, or set retarders such as the commercial keratinaceous retarders, sodium citrate, citric acid and the like.

The amount of the dead burned gypsum additive which is employed in the plaster composition of the invention is variable depending upon a number of factors including the Blaine value of the additive, the particular gypsum plaster, the type and amount of aggregrate material employed as well as the particualr working qualities desired in the finishing plaster. In general, the dead burned gypsum additive is employed in amounts ranging from about 2 to about 30% by weight of the plaster composition. When the Blaine value of the additive is low, such as slightly above the minimum, a great amount of the additive is generally required with lesser amounts being required in the case of high Blaine value additives.

One method of preparing a dead burned gypsum additive suitable for use in accordance with the invention involves the use of a recalcined gypsum. An alpha or preferably beta type gypsum plaster is gauged with an excesssive amount of water so as to form a very fluid slurry. This slurry is stirred constantly while the calcined gypsum is setting, that is, crystallizing from the hemihydrate to the dihydrate form. During this process, acicular crystals are formed which, by virtue of the constant agitation, are prevented from interlacing or joining together crystallographically to any great extent as is usual in the absence of agitation. A high percentage of fine, prismatic crystals are thus formed. After substantially complete hydration has occurred, the slurry is then filtered to remove excess water and the filter cake is calcined for periods generally ranging from 12 to 16 hours at temperatures preferably on the order of 1100 to 1500° F. The burned cake is ground in a hammer or other type mill to form thin prismatic crystals having a Blaine surface area value (BSA) of at least about 10,000 square centimeters per gram.

In a slight modification of the above procedure in which crystal yield is improved somewhat, the agitation of the slurry is stopped immediately after hydration has taken place and the excess water is removed by filtering and washing with denatured alcohol. The crystals are then calcined and ground in any suitable mill or grinding apparatus to finely divided particle size as previously indicated.

The dead burned gypsum additive employed in the invention can also be attained by calcining gypsum rock in a suitable oven such as a beehive type oven. A temperature of 1000° should be reached within 12 hours and the calcination carried out at a temperature between 1000 and 1100° F. for 36 to 40 hours after which the temperature is raised to 1200 to 1400° F. When the oven has cooled, the gypsum rock is removed, given a preliminary crush to about 1 inch size and then ground to produce finely divided particles having a Blaine surface area value of more than about 10,000 square centimeters per gram.

Obviously, there is a relationship between the average particle size (microns) of the dead burned gypsum additive and the Blaine surface area value thereof. The Blaine surface area value increases as the particle size of dead burned gypsum decreases. However, the particle size of the dead burned gypsum need not be expressed for a clear understanding of the invention since the Blaine surface area value which is the critical factor is an inherent function thereof.

As indicated, in order to achieve improved trowelling or working properties in a plaster composition it has been found that the Blaine surface area value of the dead burned gypsum additive must be in excess of about 10,000 square centimeters per gram. The data tabulated in Table I shows the trowelling or working qualities of several finished plasters including those embraced by the invention and several comparison plasters. The dead burned gypsum additive employed in these finished plasters was prepared by calcining rock gypsum in a beehive oven at a temperature of about 1200 to 1400° F. for from 36 to 40 hours as indicated above. After calcination the dead burned gypsum was ball milled in a steam-jacketed ball mill using 10 pounds per square inch gauge steam pressure to provide particles of the size indicated and having Blaine values as shown.

The data tabulated in Table II below illustrates the effect of varying the amount of dead burned gypsum additive. The dead burned gypsum additive employed had a Blaine value of 15,700 square centimeters per gram.

TABLE II

| Plaster Formulation | H | I | J | K | L | M |
|---|---|---|---|---|---|---|
| Alpha-gypsum (lbs.) | 100 | 99 | 98 | 97 | 90 | 70 |
| Dead Burned Gypsum Additive (lbs.) | | 1 | 2 | 3 | 10 | 30 |
| Sand (lbs.) | 60 | 75 | 75 | 60 | 60 | 60 |
| Set Retarder (lbs.) | 0.15 | 0.20 | 0.20 | 0.15 | 0.13 | 0.10 |
| Working Qualities | Fair | Fair | Fairly Good | Good | Very Good | Excellent |

Table II above shows that as the percentage of the dead burned gypsum additive is increased, the working qualities of the plaster is improved.

The finished plasters made in accordance with this invention are eminently suited for machine application to a water absorptive gypsum lath in the manner described in United States Patent No. 3,035,940 to Hobson dated May 22, 1962. The plaster formulations shown below in Table III were applied in this manner by machine to a thickness of about 1/16" and subsequently trowelled.

TABLE III

| Plaster Formulation | N (lbs.) | O (lbs.) | P (lbs.) |
|---|---|---|---|
| Beta-gypsum | 100 | 100 | 100 |
| Alpha-gypsum | 100 | 94 | 86 |
| Fine silica sand | 133 | 133 | 133 |
| Retarder | 0.4 | 0.4 | 0.4 |
| Dead Burned Gypsum Additive (15,700 sq. cm./gm.) | | 6 | 14 |

TABLE I

| Plaster Formulation | A | B | C | D | E | F | G |
|---|---|---|---|---|---|---|---|
| Alpha-gypsum (lbs.) | 100 | 90 | 90 | 90 | 90 | 90 | 90 |
| Sand (lbs.) | 60 | 60 | 60 | 60 | 60 | 60 | 60 |
| Retarder (lbs.) | 0.1 | 0.09 | 0.09 | 0.09 | 0.09 | 0.09 | 0.09 |
| Dead Burned Gypsum (lbs.) | | 10 | 10 | 10 | 10 | 10 | 10 |
| Average Initial size (microns) | | 10.9 | 6.9 | 6.2 | 4.2 | 3.1 | 2.1 |
| Blaine value (sq. cm./gm.) | | 5,900 | 8,200 | 10,500 | 12,400 | 15,700 | 19,600 |
| Grinding time (min.) | | 0 | 4 | 10 | 20 | 45 | 105 |
| Working Qualities | Fair | Poor | Fair | Fairly Good | Good | Very Good | Excellent |
| Absorbency | 378 | 380.3 | 390.8 | 400 | 407 | 422.5 | 429.3 |

Each of the above plaster formulations was mixed with water to the same fluidity and applied over a gypsum lath having an especially high absorptive paper upon the surface thereof. The general working qualities of each were as indicated. The absorbency values given in Table I were determined by taking 100 grams of each formulation and miixng at the same consistency with a spatula for one minute after a one minute soak. A portion of this mix was then poured into a 5/32" high by 4½" diameter ring placed over the same type gypsum lath as above. Fifteen minutes after the application the ring was removed and the specimen trowelled to remove voids. After 30 additional minutes one cubic centimeter of water was placed upon the surface of the sample and the time noted in seconds when the water was absorbed, i.e. the time required for loss of gloss. This is an indication of the ability of each formulation to retain water upon its surface and thus a measurement of its trowelability. Longer absorbency times are more desirable.

As seen from Table I, an improvement was obtained when 10% of the additive having a Blaine value of 10,500 centimeters per gram was employed. The dead burned gypsum having a Blaine value of 8,200 gave only a fair improvement in the trowelability of the mix. Moreover, it will be noted that the samples containing the higher Blaine value additives lost water much more slowly as is desirable for workability.

In trowelling formulation N, which was prepared without the finely divided dead burned gypsum additive, blisters appeared in all trowel passes and the trowel tended to drag. A small amount of usable fat was obtained which was insufficient to fill in the blemishes, voids and catfaces. The finished plaster was relatively smooth and extremely hard; however, it was marred by visible imperfections and some catfaces.

In trowelling plaster formulations O and P, which were prepared in accordance with the invention, blisters appeared only on the initial trowelling and there was no appreciable drag on the trowel. Water trowelling these formulations on the second pass produced a great deal of usable fat. On the third pass all catfaces and trowel marks were removed with the finished surfaces being extremely hard and free from visible imperfections.

As indicated, aggregates such as sand, expanded perlite, pumice and the like can be employed in the plaster compositions of the invention. In a finishing plaster it is generally preferred to employ a graded aggregate such as sand of relatively uniform particle size such that 100% thereof will pass a #30 United States standard sieve. In general, these aggregates are employed in amounts from 0 to 250 parts per 100 parts of the gypsum plaster composition.

While the present invention is particularly advantageous for "thin-coat" plastering it is also advantageous in regular plastering wherein two or three relatively thick plaster base coats are applied with hand trowelling. To illustrate the advantages of the invention in this respect the following two base coat plasters were prepared by (1) mixing 2.5 parts of plastering sand with 1 part by weight of a cement or base coat plaster made from 1985 parts of beta-gypsum, 5 parts of hydrated lime, 3 parts of aluminum sulfate and about 5 parts of commercial keratenaceous retarder, the amount of retarder depends upon the set desired, and (2) by replacing 0.1 part of the cement plaster with 0.1 part of finely divided dead burned gypsum having a 15,700 square centimeter per gram Blaine surface area value, in the above formula. The formulations were mixed with water and hand applied to ½" ground. Seven minutes after application, both formulations were rodded. Thirty minutes after application both formulations were darbied. The formulation which was prepared with a finely divided dead burned gypsum additive in accordance with the invention, showed a longer working time than the other formulation, prepared without the finely divided dead burned gypsum. The longer working time manifested itself in making both the rodding and darbying of the formulation containing the dead burned gypsum easier at any given time than the rodding and darbying of the other formulation.

From the foregoing the advantages of the invention are manifest. The plaster compositions of the invention exhibit improved working and trowelability characteristics without the incursion of other disadvantages. While the dead burned gypsum additive employed in accordance with the invention improves the trowelability and the general working properties of the compositions, it does not materially reduce the surface hardness or strength of the set plaster. The dead burned gypsum additive employed herein tends to migrate to the surface of the applied plaster without causing or permitting the sand or other aggregate to do likewise. In this way, a good, smooth, hard finish is obtained.

Those modifications and equivalents which fall within the spirit of the invention and the scope of the appended claims are to be considered part of the invention.

I claim:

1. A gypsum plaster composition comprising a major amount of calcium sulfate hemihydrate and a minor amount sufficient to confer improved working properties to the composition of a finely divided dead burned gypsum additive having a Blaine surface area value of at least about 10,000 square centimeters per gram.

2. A composition according to claim 1 which contains, in addition, aggregate materials.

3. A composition according to claim 1 wherein the dead burned gypsum is employed in an amount from about 2 to about 30% by weight of the composition.

4. A composition according to claim 1 in which sand is employed as an aggregate material.

5. A composition according to claim 1 wherein the gypsum component is principally alpha-gypsum.

6. A composition according to claim 1 which contains, in addition, set controlling additives.

7. A process of preparing an improved gypsum finishing plaster characterized by improved working and finishing qualities when mixed with water and capable of trowelling to a hard smooth finish which comprises forming a fluid aqueous slurry of a calcium sulfate hemihydrate, stirring said slurry until at least a portion of said hemihydrate has set, forming a filter cake from said slurry, calcining said filter cake at a temperature of at least about 370° F. to a dead burned condition, disintegrating said calcined filter cake into a powder of finely divided dead burned calcium sulfate having a Blaine surface area value of at least about 10,000 square centimeters per gram and mixing said powder with a major amount of calcium sulfate hemihydrate sufficient to form a composition which is capable of setting when mixed with water 8. A process of preparing an improved gypsum finishing plaster characterized by improved working and finishing qualities when mixed with water and capable of trowelling to a hard smooth finish which comprises forming a fluid aqueous slurry of a calcium sulfate hemihydrate, stirring said slurry until at least a portion of said hemihydrate has set, forming a filter cake from said slurry, calcining said filter cake at a temperature of about 1100° F. to about 1500° F., disintegrating said calcined filter cake into a powder of finely divided dead burned calcium sulfate having a Blaine surface area value of at least about 10,000 square centimeters per gram and mixing said powder with a major amount of calcium sulfate hemihydrate sufficient to form a composition which is capable of setting when mixed with water.

9. A process of preparing an improved gypsum finishing plaster characterized by improved working and finishing qualities when mixed with water and capable of trowelling to a hard smooth finish which comprises calcining gypsum rock at a temperature of about 1000° to about 1100° for a time in excess of about 36 to 40 hours, further calcining the gypsum rock at a temperature in the range of 1200 to 1400° F., then crushing the calcined gypsum rock to produce finely divided particles having a Blaine surface area value of at least about 10,000 square centimeters per gram, and mixing said powder with a major amount of calcium sulfate hemihydrate sufficient to form a composition which is capable of setting when mixed with water.

References Cited by the Examiner

UNITED STATES PATENTS

| 1,266,200 | 5/1918 | Blumenberg | 106—110 |
| 2,015,676 | 10/1935 | Heiser | 106—110 |
| 2,031,585 | 2/1936 | Best et al. | 106—110 |
| 2,341,426 | 2/1944 | Dailey | 106—110 |
| 2,754,220 | 7/1956 | Gardner | 106—110 |
| 2,947,643 | 8/1960 | Kamlet | 106—109 |
| 3,181,985 | 5/1965 | Gates et al. | 106—109 |

FOREIGN PATENTS

| 243,015 | 11/1926 | Great Britain. |

HELEN M. McCARTHY, *Acting Primary Examiner.*

TOBIAS E. LEVOW, *Examiner.*

S. E. MOTT, *Assistant Examiner.*